June 20, 1967 W. V. L. CAMPAGNE 3,326,941
CONDENSATION OF PHTHALIC ANHYDRIDE
Filed Aug. 7, 1963 2 Sheets-Sheet 1
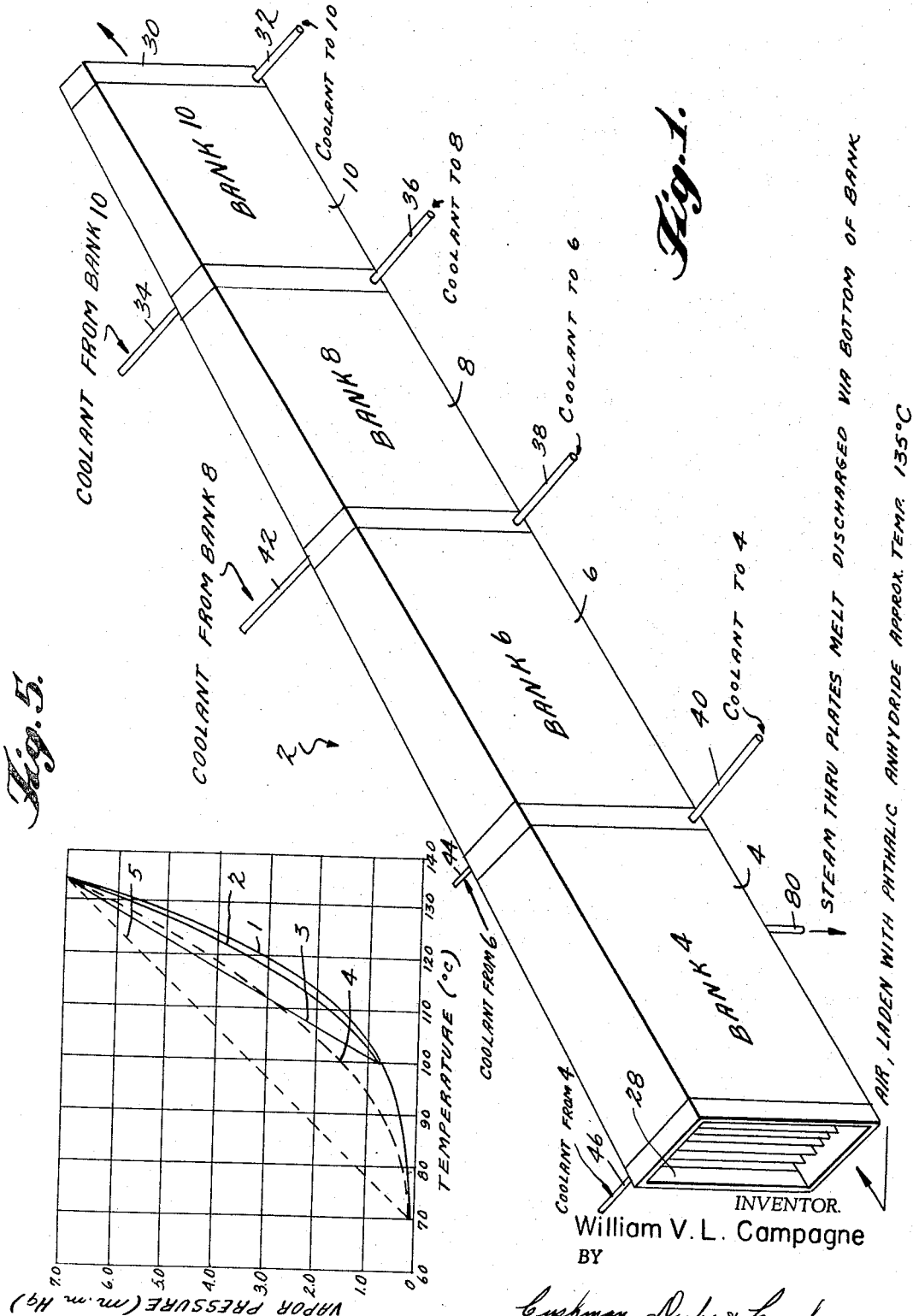
INVENTOR.
William V. L. Campagne
BY
Cushman, Darby & Cushman
ATTORNEYS June 20, 1967  W. V. L. CAMPAGNE  3,326,941
CONDENSATION OF PHTHALIC ANHYDRIDE
Filed Aug. 7, 1963  2 Sheets-Sheet 2
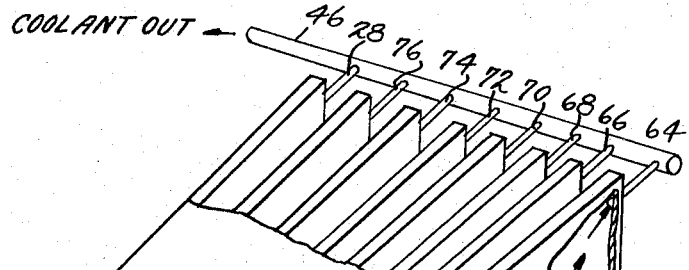
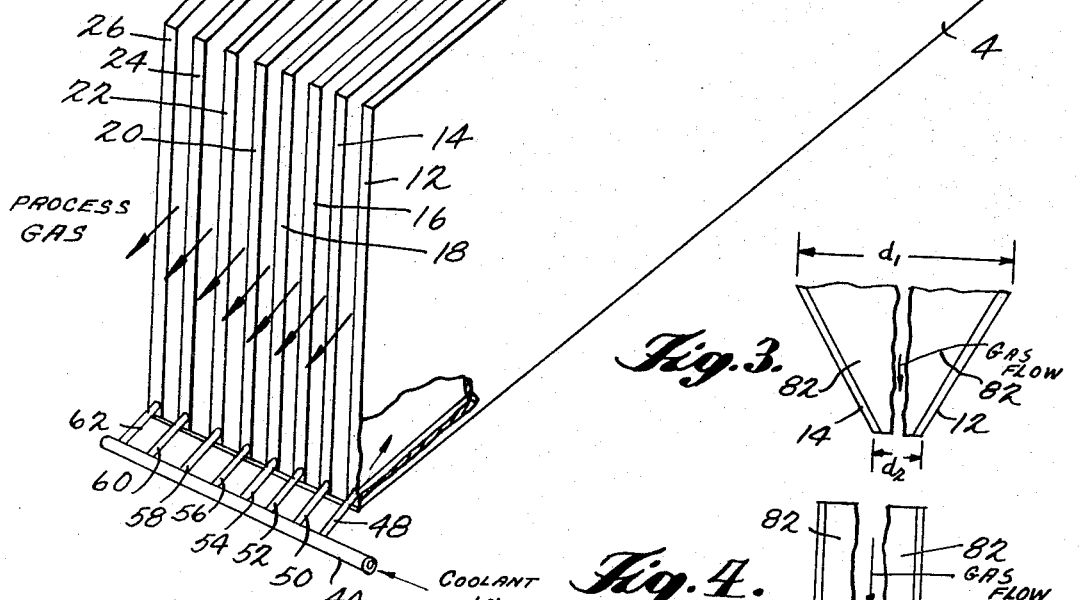
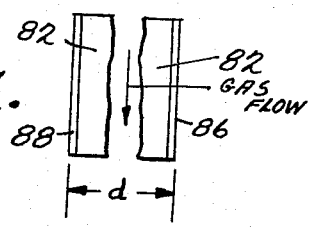
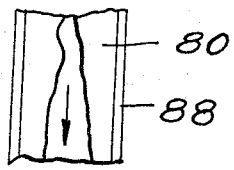
INVENTOR
William V. L. Campagne
BY
Cushman, Darby & Cushman
ATTORNEYS 3,326,941
CONDENSATION OF PHTHALIC ANHYDRIDE
William v. L. Campagne, Beaver, Pa., assignor, by mesne assignments, to United States Steel Corporation, Pittsburgh, Pa., a corporation of Delaware
Filed Aug. 7, 1963, Ser. No. 300,480
6 Claims. (Cl. 260—346.7)

This application is a continuation-in-part of application Serial No. 244,381, filled December 13, 1962 now abandoned. The entire disclosure of the parent application is hereby incorporated by reference.

The present invention relates to the recovery of phthalic anhydride from vapor phase processes.

In normal practice today in condensing phthalic anhydride vapors there is a low velocity input of phthalic anhydride vapor due to pressure drop considerations in the condenser. Thus, the velocity is usually 2 to 4 feet per second or lower. Such procedure also requires a big difference between the coolant temperature and the phthalic anhydride vapor temperature. Thus, the coolant is generally between 40 and 50° C., and the phthalic anhydride vapor enters at 132±3° C. or above and exits at 50 to 60° C. In such a procedure, the standard practice is for countercurrent flow of the cooling agent and vapor. In most of such conventional operations the flow of the phthalic anhydride vapor is at right angles to the direction of the condenser tube layout. When the vapor and tube layout are in the same direction, the Reynolds number for the flow is generally not over 2000.

Many difficulties are encountered during the condensing cycle in vapor phase cyclic condensers. There are three major difficulties which will be discussed below. None of them has been completely solved as yet despite attempts as shown in proposed or designed condenser systems, e.g., British Patent No. 751,352, Belgian Patent No. 578,911, the Von Heyden condenser and many others.

In the first place, part of the phthalic anhydride particles will sublime before the cooling surface has been reached. This effect, by some called "space nucleation," generates a very fine "mist" of solid particles in the process gas stream, clogging up outlet piping. As a result, phthalic anhydride producers tend to lower the gas velocity in order to reduce the entrainment of these solid particles. My experiments with "space nucleation" show that such a measure will aggravate rather than alleviate the "mist formation." Until the present, when faced with the problem of "space nucleation," the manufacturer has chosen one of two alternatives. He either accepts a substantial product loss or he installs screening devices at the condenser outlet to recover most of the "phthalic mist."

Frequently, expensive devices have been developed and are effectively in use to filter out these light phthalic anhydride particles for reasons of recovery or to prevent air pollution. In other cases such filter or other type of dust-collector devices serve to prevent plugging of either exit lines or the purification systems of the exit gases. Besides the investment costs of these filtering devices, there is also the disadvantage of a higher pressure drop. Consequently, this leads to more expensive compressors for the process air and higher utility costs.

Prior to the subject invention, no operational techniques were known to prevent this "space nucleation" in phthalic anhydride condensers. Rather, endeavors were made to remedy its ill effects.

The conventional procedures, as indicated, suffer from the disadvantage of mist formation. Additionally, the necessity to use low velocity, generally linear, flow makes it impossible to operate the condensers at maximum efficiency. Also, the standard procedures require relatively large surface and, hence, more costly condensers. (Normally, it is desirable to use a minimum amount of heat exchange surface.) Furthermore, some phthalic anhydride condenses in the form of small solid particles which remain in the gas stream and clog the system with the result of substantial phthalic anhydride loss and an undesirable pressure drop.

In my parent application, there is disclosed a process of subliming phthalic anhydride without space nucleation from a gas containing phthalic anhydride in vapor phase which process comprises passing the phthalic anhydride and cooling fluid in a condenser in countercurrent flow at a temperature difference not exceeding 60° C., the Reynolds number of the gas ranging preferably from 3200 to 7000, although it can be 8000 or higher. The condenser is designed so that there are equal loadings (i.e., equal poundage of deposited phthalic anhydride for each square foot of cooling surface).

It is an object of the present invention to develop an improved method of subliming phthalic anhydride vapors in cyclic condensers.

Another object is to eliminate mist formation in subliming phthalic anhydride vapors.

An additional object is to utilize less heat exchange surface to sublime the same amount of phthalic anhydride vapor.

A further object is to use higher velocity gas flow than has previously been possible in subliming phthalic anhydride vapor.

Yet another object is to reduce the amount of phthalic anhydride which remains as small particles in the gas stream and, hence, to reduce the clogging which normally occurs.

A related object is to reduce product losses by eliminating space nucleation and thus, at the same time, reduce the clogging which normally occurs.

A further object is to eliminate off gas scrubbers and/or combustion systems as used in the prior art by erection of the condenser design of the present invention in a vertical, chimney-like position, thus exiting the off-gases at a level sufficiently high to safeguard the neighboring community from air pollution.

A still further object is to eliminate needles or hay-like deposition of the sublimable product and thus further reduce product losses.

Yet another object is to utilize more compact recovery units than was possible heretofore.

An additional object is to minimize the heat exchanger-surface requirements in the coolant circuit during the condensing cycle.

A further object is to design a phthalic anhydride condenser requiring less cooler surface than is required under the equal loading principle of my parent case.

An additional object is to devise a phthalic anhydride condenser system requiring less controls than is possible with the equal loading system.

A still further object is to obtain greater flexibility in selecting the numbers of banks of condensers.

A related object is to minimize refining requirements by a proper selection of the condenser banks which permits a fractionated (segregated) crude recovery in respect to optimizing the purity level of the different crude fractions by choice of the temperature trajects for each bank in accordance with feed stock and conversion particulars.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be most effectively attained if, contrary to the majority of present practice, the phthalic anhydride containing gas flows in the same general direction as the layout of the condenser cooling surface, and also if the temperature pattern of the coolant is maintained at such a predetermined condition as to insure prerequisite patterns of the gas temperature.

Until now it was thought immaterial whether the cooling pipes were laid out in the direction of gas flow or perpendicular to this direction, in other words, whether the flow pattern was parallel flow (parallel to the cooling pipes) or cross-flow (perpendicular to the cooling pipes). Actually, the majority of the condensing systems are designed in the cross-flow pattern. In the present invention parallel flow is favored because less economic designs would result if the principles of the three features described below were applied to the cross-flow pattern.

While in the drawing the condenser plates are shown as being flat or straight it is to be understood that curved plates can be utilized as well, e.g., concentric cones can be employed.

The invention will be best understood by a consideration of the drawings wherein:

FIGURE 1 is an isomeric view of a condenser layout suitable for use according to the invention;

FIGURE 2 is a view similar to FIGURE 1 showing one of the banks of condensers partially broken away;

FIGURE 3 is a view showing the build up of phthalic anhydride between two condenser plates according to the invention;

FIGURE 4 is a view similar to FIGURE 3 but showing the build up according to the equal loading procedure of the parent application using 10 banks of plates;

FIGURE 5 is a graph illustrating the advantages of the present invention over the equal loading procedure; and FIGURE 6 is a view similar to FIGURE 4 but showing the phthalic anhydride accumulation employing a smaller number of banks of plates, e.g., 5 banks.

According to the parent application and the present invention there is "mist-free" operation. It has been found that a correlation exists between (a) difference in temperature between the cooling fluid and the gas stream containing the sublimable vapor ($\Delta T$), (b) the Reynolds number of the sublimable phthalic anhydride vapor containing gas flow, and (c) space nucleation of the sublimable phthalic anhydride. The Reynolds number should be kept above 3200, is usually above 20,000 and preferably is at least 30,000. This difference in temperature ($\Delta T$) between coolant and gas stream should not be over 60° C. in the Reynolds number range of 3000–7000—as in the parent application—can be up to 100° C. for Reynolds numbers above 20,000—as in the present invention—but normally is between 5–50° C. I have found that the higher the Reynolds number, the higher the allowable temperature difference, e.g., with a Reynolds number of 6000, the temperature difference could be as high as 60° C., whereas with a Reynolds number of about 4500, the temperature difference should not be much over 50° C., but with a Reynolds number of about 12,000 this temperature difference can be as high as about 70° C. The Reynolds number can be 60,000 or higher. The only limit in this respect is governed by cost considerations. These Reynolds numbers insure a high velocity flow which is essential to the process described herein, and an important economical advantage over the present practices which require low velocities since high velocities in prior art systems cause excessive entrainment of the phthalic anhydride mist. It will be obvious that the above $\Delta T$ values pertain to parallel flow only.

The Reynolds number, as is known, is a function of the velocity of the gas and the dimension of the flow area available for the gas. Since the gas (containing phthalic anhydride vapor) is to be flowed outside the tube or other type of cooling surfaces, in a parallel direction, the equivalent diameter of the vapor space outside the cooling surface is the dimension which is employed. (In experimental runs the gas containing phthalic anhydride vapor was flowed through the tube and the coolant was outside the tube. In this case, the inner diameter of the tube was used to determine the Reynolds number).

As has been indicated previously, it has also been found that, contrary to the majority of present practice, the phthalic anhydride vapors should flow in the same general direction as the condenser tube layout in order to keep gas conditions uniform and tightly controlled within the $\Delta T$ limits set forth above. These conditions are not fulfilled in cross-flow where the gas contracts and expands when passing tube rows.

As in standard procedure, the inlet temperature of the gas containing phthalic anhydride vapor is 132±3° C. and the outlet temperature range is 45 to 65° C., i.e., above the dewpoint of water vapor and maleic anhydride at the operating conditions. The coolant, e.g., oil or water, normally enters at a temperature slightly below or equal to the desired outlet temperature range, usually at 40 to 45° C. However, as in certain newer practices the coolant can enter at higher temperatures, e.g., 120° C. if, for example, pressure reduction is employed. In this latter procedure flow of coolant and gas is concurrent. The coolant and gas, however, can also be used in countercurrent flow as in the standard commercial operation. The layout of the cooling surface in the condenser can be either in a vertical or horizontal pattern.

This feature of the invention provides a very important improvement economically over the present practice of recovering sublimable concentrations of phthalic anhydride in cyclic condensers as is explained in the parent application.

If in the experimental unit the gas velocity is increased to relatively high Reynolds numbers, e.g., about 4000, and if the coolant temperature is held at its minimum in respect to "mist-free" operation (the actual allowable maximum $\Delta T$ between coolant and gas stream being dependent upon the Reynolds number as set forth above), then it will be observed that the phthalic anhydride deposits in certain areas are in a needle-like fashion. After a certain growth, these needles will be blown off. This blowing away of the phthalic anhydride needles becomes more and more predominant at higher Reynolds numbers because of the higher gas velocities. These needles are collected on the steel wool plug in the condenser outlet without causing a noticeable increase in pressure drop, as was the case when "mist" was retained on the same plug. Apparently, the needles settle down in a porous fashion, thus leaving adequate space for the gas to pass without pressure build-up. Still, it means that in industrial units sublimated phthalic anhydride would be blown from the tubes and be lost for recovery.

When raising the coolant temperature above this minimum in respect to "space nucleation," the needles gradually disappear and the apparent density of the phthalic anhydride sublimate increases. A very dense phthalic anhydride coating is obtained when the coolant temperature is raised closer to the gas stream temperature, in other words, $\Delta T$ is reduced to, say 40° C. or lower, preferably below 10° C.

This finding is very significant because it means (a) an increased recovery since the needle-like sublimation which normally would have been blown out of the system has stopped, and (b) a compactness of the recovery unit.

From the above it is obvious to a person skilled in the art that one of the major concerns in the sublimation of phthalic anhydride is the development of a process under tightly controlled conditions of flow and temperature.

The phthalic anhydride condenser is basically an air cooler in which ample spacing is provided between the cooler surfaces for the subliming phthalic anhydride. The controlling heat transfer mechanism therefore is only the removal of sensible heat from the gas stream, rather than the summation of sensible heat and the heat of sublimation. The latter, it may be noted, is subject to heat transfer mechanisms 10 to 100 times faster than convective heat transfer.

The surface requirement for a phthalic anhydride condenser depend on
(1) Sensible heat load.
(2) Log mean temperature difference (LMTD) between coolant and gas.
(3) The controlling convective heat transfer coefficient (in the present case this is the air film coefficient, $h$).

$$h = \text{constant } x \frac{(N_{Re})^n}{D_{eq}}$$

where $D_{eq}$ is the equivalent diameter, and $N_{Re}$ is the Reynolds number.

The Reynolds number is only dependent upon the quantity of flow (SCFM), and the contour of cooling body but is not dependent on the spacing or flow area. The contour of the cooling surface is the total length of the periphery to which the gas stream is exposed in cross-sectional projection.

The cooling surface requirements A are $$A = \frac{\text{sensible heat load}}{h \times \text{LMTD}}$$

which can be expressed in general form as Equation 1 (since the sensible heat load per SCFM is generally a constant)

$$A/\text{SCFM } \alpha \frac{D_{eq}}{(N_{Re})^n \times \text{LMTD}}$$

when the surface requirements per unit quantity are desired (where SCFM=standard cubic feet per minute of gas flow) and $\alpha$ is the "proportional to" sign.

For plate-type $D_{eq}$ is the spacing between the plates.

For Reynolds numbers greater than 2100 $n=0.8$ and hence the equation becomes Equation 2

$$A/\text{SCFM } \alpha \frac{\text{spacing (contour)}^{0.8}}{(\text{SCFM})^{0.8} \times \text{LMTD}}$$

The ultimate thickness of the phthalic anhydride buildup dictates the spacing.

The use of converging plates according to the present invention permits one to minimize this spacing and at the same time utilize the phthalic anhydride vapor pressure curve to best advantage in designing the condenser.

The contour (Equation 2) is inherent in any selected layout and is not a variable to be considered when comparing converging versus parallel surfaces. The contour ($A/L$ in which L=length) however, is of substantial importance in the pressure drop consideration, together with the SCFM loading and spacing.

The advantage of converging plates over the equal loading principle is clear from Equation 2.

The phthalic anhydride deposition in a cooler bank is heavier at the inlet than at the outlet, because of the gradual drop in temperature and the attending drop in the saturation concentration. Consequently, equidistant plates have to be spaced, according to the phthalic anhydride concentration at the inlet to prevent the build-up in the inlet from choking the unit down prematurely in the condensing cycle.

For a parallel layout wherein the plate spacing is $d$ and the Reynolds number is above 2100, the equation becomes $$h \alpha \frac{(N_{Re})^{0.8}}{d}$$

Therefore the surface requirements A per SCFM is directly proportional to $d$.

Consequently, it is advantageous to gradually reduce the plate spacing to conform to the decrease in phthalic build-up against the plate. The required spacing at the inlet ($d_{in}$) and outlet ($d_{out}$) can be calculated from the phthalic anhydride vapor pressure curve, which yields the thickness of the build-up, and adding to it the clearance requirement between the loaded plates as dictated by the final design pressure drop.

As the overall spacing is reduced from $d_{in}$ (required for equidistant spacing) to a value somewhere between $d_{in}$ and $d_{out}$, the surface requirement will also be reduced accordingly. The average spacing for converging plates which will describe the savings in surface requirement is log mean ($d_{in}$ and $d_{out}$).

With converging plates the heat transfer coefficient improves from $$h_{in} \alpha \frac{(N_{Re})^{0.8}}{d_{in}} \text{ to } h_{out} \alpha \frac{(N_{Re})^{0.8}}{d_{out}}$$

in which the Reynolds number is the same. The applicable heat transfer equation has been derived by me to be as follows:

$$Q = A \text{ LMTD } (N_{Re})^{0.8} \times \frac{\ln (d_{in}/d_{out})}{d_{in} - d_{out}} \times (K)$$

or $$Q/A = \text{LMTD} \times \frac{(N_{Re})^{0.8}}{(\log \text{ mean spacing})} \times (K)$$

where Q is the sensible heat load per unit of time and K is a constant including the Prandtl number and thermal conductivity of the air stream laden with phthalic anhydride.

In both the "equal loading" and the "converging plate" systems, the inlet and outlet temperatures per condenser pass (=cooler—bank) are selected from the phthalic anhydride vapor pressure curve and from this drop in temperature the phthalic anhydride loading can be found.

In the case of equal loading, the surface requirement is matched to obtain an equal number of pounds of phthalic anhydride per square foot. This does not permit one to take into account the heavier build-up in the inlet.

For the converging plate system, the inlet and outlet temperature for a pass are selected and the $dp/dt$ gradient (where $p$ is pressure and $t$ is temperature) at inlet and outlet are measured from the vapor pressure curve. It is possible to follow the phthalic anhydride vapor pressure curve more closely with the converging plate procedure than with the equal loading system. Consequently, there is less contingency needed by the designer of the equipment for spacing the plates to prevent localized pressure build-ups and hence the less cooling surface required.

There are several important advantages of the converging plate system over the equal loading system.

In the first place, less cooler surface is required. Thus in the case of the specific example set forth below 20% more cooler surface would have been required if there were five passes using the equal loading method and if there were only two or three passes the increased cooler surface area with equal loading would have been 56%.

The number of passes in the equal loading procedure requires a striking of the balance between reduced cooler surface costs and increased instrumentation costs. The number of passes (banks) in the converging plate method is determined merely by economical considerations such as available plate length and process considerations such as the desired segregation of the crude product.

The phthalic anhydride concentration of the gas at the condenser inlet is within the conventional range of 0.6 to 1.2 mol percent. The balance is air with impurities from the reaction.

Referring more specifically to FIGURES 1 and 2 of the drawings, there is provided a condenser 2 having a plurality of banks (e.g., four banks) 4, 6, 8, 10 of cooler plates 12, 14, 16, 18, 20, 22, 24 and 26. While the plates are shown in a vertical arrangement alternatively, they can be arranged horizontally or at an angle with the vertical plumb line.

The cooler plates in the drawings are of equal height and length and it is essential that the distance between the plates gradually decreases over each bank and also from bank to bank. It is possible to employ plates of unequal heights and lengths and of varying curvature.

Hot air containing phthalic anhydride vapors at e.g., about 135° C. is introduced through gas inlet 28 to the first bank 4 and travels in the direction of the arrows over the banks of cooler plates 12, 14, 16, 18, 20, 22, 24 and 26. At the same time, the phthalic anhydride sublimes against the cooler plate outer surfaces. The air from which the phthalic anhydride has been removed exits through gas outlet 30 at a temperature of about 50° C. from the last bank 10. Coolant e.g., oil, is pumped into the plates in bank 10 through pipe 32 and emerges through pipe 34. Similarly, coolant goes to the plates in banks 8, 6 and 4 respectively through pipes 36, 38 and 40 respectively and emerges through pipes 42, 44 and 46 respectively. As shown in FIGURE 2, the inlet pipe e.g., 40 for the coolant serves as a manifold to the distribute coolant evenly via tubes 48, 50, 52, 54, 56, 58, 60 and 62 to the individual plates 12, 14, 16, 18, 20, 22, 24 and 26 of the bank and the outlet pipe e.g., 46 for the coolant serves as a manifold to collect coolant via tubes 64, 66, 68, 70, 72, 74, 76, and 78 from the individual plates.

The coolant emerging from one bank can be employed as the coolant introduced into another bank having a phthalic anhydride laden gas stream passing thereover at a higher temperature than that in said one bank. However, it is not necessary to do so and frequently for efficient operation it is desirable to employ completely independent coolant lines in each bank. The coolant temperature can be controlled in any desired manner.

The gases, it will be observed, are in countercurrent but parallel flow to the coolant.

Since the banks are lined up behind each other, the process stream of phthalic anhydride laden air flows from one bank (pass) onto the other, in straight line flow, without reversal in direction as is the case in conventional condensers. This feature has the economic advantage of eliminating baffles with their inherent problem of leaking. If baffles were employed, they would generate excessive pressure drop over the U bend areas at the very high gas flow rates employed, e.g., Reynolds number above 20,000.

The overall condenser 2 resembles a long rectangular duct with a trapezoidal ground plan.

When sufficient phthalic anhydride has sublimed on the cooler plate surfaces, the flow of air is stopped and steam or other warm fluid is passed through the cooler plates in the banks to melt the phthalic anhydride which is then discharged as a liquid via the bottom of the banks, e.g., through conduit 80.

As is known in the art, the phthalic anhydride 82 as shown in FIGURES 3, 4 and 6 sublimes against the outside surfaces of the cooling plates 88. FIGURE 3 shows the manner of sublimation using converging cooling plates 12 and 14 according to the invention and FIGURE 4 shows the manner of sublimation using the equal loading principle and parallel plates as disclosed in the parent application. The direction of gas flow in FIGURES 3 and 4 is indicated by the arrows. It is clear that if $d_2$ equals $d$ then for any given $d_2$ more phthalic anhydrides can be sublimed using the converging plate system of FIGURE 3 than the equal loading system of FIGURE 4.

FIGURE 5 is a graph showing a comparison between the vapor pressure and temperature coordinates in the present invention and in the equal loading procedure.

In FIGURE 5, curve 1 is the phthalic anhydride vapor pressure curve. Curve 2 is the pressure-temperature curve for the converging plate system with an inlet gas temperature of 135° C. and an exit gas temperature of 100° C. Curve 3 is the corresponding curve for the equal loading system with an inlet gas temperature of 135° C. and an outlet gas temperature of 100° C. Curve 4 is the pressure-temperature curve for the converging plate system with an inlet gas temperature of 135° C. and an outlet gas temperature of 70° C. while curve 5 is the corresponding curve for the equal loading system with an inlet gas temperature of 135° C. and an outlet gas temperature of 70° C.

It can be readily seen that the curves for the converging plate system more closely approximate the phthalic anhydride vapor pressure curve than do the corresponding equal loading curves. It may be noted that the converging plate curves are parabolic in nature. It will also be observed that the smaller temperature trajects more closely fit the vapor pressure curve.

*Example 1*

In a specific example utilizing the apparatus of FIGURES 1 and 2 but employing five banks of ten vertical plate coils of equal height and length there was provided a heat exchange surface of 7,650 square feet. The overall dimensions of the condenser was 60 feet long, 8 feet high and had a width varying from 4 feet at the inlet to 1.2 feet at the outlet. The phthalic anhydride containing gases were introduced at a velocity of 13,500 standard cubic feet per minute (SCFM) at 135° C. The Reynolds number was 33,500 in the first three banks and 52,200 in the last two.

The coolant was introduced into the first (hottest) bank at 90° C. and exited at 105° C. The coolant was introduced into the second bank at 80° C. and exited at 90° C. The coolant was introduced into the third bank at 70° C. and exited at 80° C. The coolant was introduced into the fourth bank at 57° C. and exited at 70° C. The coolant was introduced into the fifth bank at 49° C. and exited at 57° C.

The phthalic anhydride laden gas exited from the first bank at 120° C., from the second bank at 110° C., from the third bank at 100° C., from the fourth bank at 80° C., and from the fifth bank at 56° C. The gases leaving the condenser contained all the water and maleic vapors which were present at the inlet but only ¼% of the phthalic anhydride present in the inlet gas. The condenser was maintained on stream for eight hours. In another run no phthalic anhydride was detected in the exit gases. The condenser operated without space nucleation. After having been maintained on stream for eight hours, the total pressure drop over the entire condenser had reached 1.03 p.s.i. and the bulk density of the sublimed crude phthalic anhydride was approximately forty pounds per cubic foot.

A comparison between the converging system and other systems is given in the following table:

|  | Commercial System | Belgian Patent | Equal Loading | | Converging Plates |
|---|---|---|---|---|---|
|  |  |  | Tubes | Plates |  |
| S.c.f.m. load | [1] 7,000 | 10,000 | 10,000 | 10,000 | 10,000 |
| Hrs. cycle time | 16 | 5.25 | 6.4 | 14.0 | 8 |
| Sq. ft. cooling surface | 13,230 | 36,500 | 20,400 | 22,600 | 5,850 |
| Mist-free operation | No | No | Yes | Yes | Yes |

[1] Maximum.

The Belgian patent conditions and results are those utilizing Example 2 of Belgian Patent 578,911. The equal loading conditions and results are those of Examples 2 and 3 of applicant's parent case operating at a Reynolds number of 7000, phthalic anhydride containing gas introduction at 135° C. and exit at 55° C. with coolant introduction at 127.5° C. and exit at 50° C.

The conditions and results for the converging plate system were using the phthalic anhydride containing gas temperatures and coolant temperatures set forth in Example 1 utilizing a condenser having five banks containing ten cooling plates each.

The commercial system was one employed by a large phthalic anhydride manufacturer in its plant.

It can readily be seen that the converging plate system is more desirable and requires less cooling surface area than the other methods.

In another aspect of the invention it has been found that with a sufficiently high Reynolds number the temperature difference between the vapor and the coolant can exceed 60° C. regardless of whether condensers having converging surfaces or parallel surfaces are employed. Preferably the condensers have converging surfaces since smaller surface areas can be utilized to condense the same amount of phthalic anhydride.

As stated previously at a Reynolds number of 12,000 the temperature difference can be up to 70° C. and at a Reynolds number of about 15,000 a temperature difference of up to 80° C. can be employed while at a Reynolds number of 20,000 or above a temperature difference as high as 100° C., or more can be used and still maintain mist-free operation.

Example 2

In another example, there were employed five banks of plates which were spaced equidistant rather than being convergent. The spacing between the ten plates was largest in the first or inlet bank, became slightly smaller in the second bank and thus decreased for each successive cooler bank until a minimum spacing was obtained in the outlet bank. As in the previous example, in each bank the plates were of equal height and length.

With five cooler banks, the build-up of the phthalic anhydride on the plate surfaces was as in FIGURE 6. When ten cooler banks (or more) are employed a build-up as in FIGURE 4 is obtained.

Using five cooler banks a heat exchange surface of 8,540 sq. ft. was provided. The overall dimension of the condenser was 150 ft. long, 3 ft. high and a width varying from 4¾ ft. for the inlet bank to 1½ ft. for the outlet (coldest) bank. The phthalic anhydride containing gases were introduced at a velocity of 9,500 standard cubic feet per minute (SCFM) at 135° C. The Reynolds number was 65,000 in all five banks.

The coolant was introduced into the first (hottest) bank at 95° C. and existed at 110° C. The coolant was introduced into the second bank at 85° C. and exited at 95° C. The coolant was introduced into the third bank at 75° C. and exited at 85° C. The coolant was introduced into the fourth bank at 55° C. and exited at 75° C.; was introduced into the fifth bank at 50° C. and exited at 55° C.

The phthalic anhydride laden gas exited from the first bank at 120° C., from the second bank at 110° C., from the third bank at 100° C., from the fourth bank at 80° C. and from the fifth bank at 55° C. The gases leaving the condenser contained all the water and maleic vapors present at the inlet, but less than ¼% of the phthalic anhydride present in the inlet gas could be detected in the exit gases.

This condenser operated without any space nucleation. After having been maintained on stream for 16 hours, the total pressure drop over the entire condenser had just reached 1.9 p.s.i an the average bulk density of the crude phthalic anhydride was approximately 40 pounds per cubic foot.

Example 3

In still another example, utilizing the apparatus of FIGURES 1 and 2 but employing five banks of 29 vertical plates of equal height and length, there was provided a heat exchange surface of 11,000 sq. ft. The overall dimension of the condenser was 20 ft. long, 10 ft. high and had a width varying from 8.8 ft. at the inlet to 1¾ ft. at the outlet. The phthalic anhydride containing gases were introduced at a velocity of 10,000 standard cubic feet per minute (SCFM) at 135° C. The Reynolds number was 7000 in all five banks.

The coolant flowed countercurrently through the first (hottest) bank and was introduced at 50° C. and exited at 65° C.; through the other banks, 2 through 5, the coolant flowed either concurrently or countercurrently, inflowing slightly below 50° C., e.g., 49.5° C. and exiting slightly above 50° C., e.g., 50.5° C.

The phthalic anhydride laden gas exited from the first bank at 120° C., from the second bank at 110° C., from the third bank at 100° C., from the fourth bank at 80° C. and from the fifth bank at 55° C. The gases leaving the condenser contained all the water and maleic vapors which were present at the inlet, but now there was detected more than the theoretically to be expected ¼% of the phthalic anhydride present in the inlet gas. During the first hour of the condensing cycle up to 1% phthalic anhydride was found in the exit gas; later on this amount became smaller but still stayed well above ¼% due to space nucleation.

After having been maintained on stream for 8½ hours, the total pressure drop over the entire condenser had reached 1.3 p.s.i. and the bulk density of the sublimed crude phthalic anhydride was approximately an average of 30 pounds per cubic foot.

This example embodies some of the novel concepts of the converging plate design described herein but is not a mist free operation. Therefore, the results obtained are not as good as those in Examples 1 and 2, although it constitutes a vast improvement over the prior art because of its savings on cooler surface.

What is claimed is:

1. A process of subliming phthalic anhydride from a gas containing phthalic anhydride in vapor phase comprising passing the phthalic anhydride in mist-free operation between converging condenser plates containing coolant and in countercurrent flow to the coolant, said gas stream passing in straight line unidirectional flow.

2. A process according to claim 1 wherein the operation is carried out at a temperature difference not exceeding 60° C. for a Reynolds number range of the gas from 3200 to 7000.

3. A process according to claim 1 wherein the operation is carried out at a temperature difference not exceeding 70° C. for a Reynolds number range of the gas from 7000 to 12000.

4. A process according to claim 1 wherein the operation is carried out at a temperature differntial not exceeding 80° C. for a Reynolds number of the gas of at least 15,000.

5. A process of subliming phthalic anhydride from a gas containing phthalic anhydride in vapor phase comprising passing the phthalic anhydride between condenser surfaces, said condenser containing coolant, the gas and coolant being in countercurrent flow, said gas having a Reynolds number of at least 12,000, the temperature differential between the gas and the coolant and the Reynolds number being selected so that the combination of the temperature differences and Reynolds number gives a mist-free operation.

6. A process according to claim 1 wherein the operation is carried out at a temperature differential not exceeding 100° C. for a Reynolds number of the gas of at least 20,000.

References Cited

UNITED STATES PATENTS 2,692,657    10/1954    Barton _____ 260—346.7

NICHOLAS S. RIZZO, *Primary Examiner.*